United States Patent
Hsiang et al.

(10) Patent No.: US 12,456,578 B2
(45) Date of Patent: Oct. 28, 2025

(54) METAL ELECTRODE OF CERAMIC CAPACITOR AND METHOD OF FORMING THE SAME

(71) Applicants: YAGEO CORPORATION, Kaohsiung (TW); NATIONAL CHENG KUNG UNIVERSITY, Tainan (TW)

(72) Inventors: Hsing-I Hsiang, Tainan (TW); Fu-Su Yen, Tainan (TW); Chi-Yuen Huang, Tainan (TW); Chun-Te Lee, Kaohsiung (TW); Kai-Hsun Yang, Kaohsiung (TW); Shih-Ming Wang, Kaohsiung (TW)

(73) Assignees: YAGEO CORPORATION, Kaohsiung (TW); NATIONAL CHENG KUNG UNIVERSITY, Tainan (TW)

( * ) Notice: Subject to any disclaimer, the term of this patent is extended or adjusted under 35 U.S.C. 154(b) by 393 days.

(21) Appl. No.: 18/173,799

(22) Filed: Feb. 24, 2023

(65) Prior Publication Data
US 2024/0170211 A1    May 23, 2024

(30) Foreign Application Priority Data
Nov. 18, 2022   (CN) .......................... 202211448549.8

(51) Int. Cl.
*B22F 3/10*   (2006.01)
*B22F 1/107*  (2022.01)
(Continued)

(52) U.S. Cl.
CPC ............. *H01G 4/008* (2013.01); *B22F 1/107* (2022.01); *B22F 1/16* (2022.01); *B22F 3/1021* (2013.01);
(Continued)

(58) Field of Classification Search
None
See application file for complete search history.

(56) References Cited

U.S. PATENT DOCUMENTS

2003/0160219 A1* 8/2003 Shimizu ............... H01G 4/0085
                                                    252/521.2
2010/0110608 A1   5/2010 Wei et al.
(Continued)

FOREIGN PATENT DOCUMENTS

CN         1393423 A     1/2003
CN       102254585 A    11/2011
(Continued)

OTHER PUBLICATIONS

Yejung Choi et al., "Metal-Organic Decomposition Ink for Printed Electronics," Advanced Materials Interfaces, 2019, vol. 6, pp. 1901002 (1-14).

(Continued)

*Primary Examiner* — George Wyszomierski
(74) *Attorney, Agent, or Firm* — CKC & Partners Co., LLC (57) ABSTRACT

A metal electrode of a ceramic capacitor and a method of forming the same are provided. The method includes mixing metal powders and a barium titanate organic-precursor to obtain precursor powders; adding an adhesive to the precursor powders to obtain a metal slurry; performing a molding process to the metal slurry to obtain a film material; performing a binder burn-out process to the film material to obtain a degumming film; and performing a sintering process to the degumming film to obtain the metal electrode. By mixing specific amount of barium titanate organic-precursor with the metal powders, the barium titanate metallic organic-precursor can be transformed to barium titanate in the following process, and barium titanate can be dispersed between the metals homogeneously. Therefore, electrode continuity can be increased.

15 Claims, 4 Drawing Sheets

(51) Int. Cl.
  *B22F 1/16*  (2022.01)
  *B22F 3/23*  (2006.01)
  *B22F 7/04*  (2006.01)
  *C22C 1/04*  (2023.01)
  *C22C 1/05*  (2023.01)
  *H01G 4/008* (2006.01)

(52) U.S. Cl.
  CPC .................. *B22F 3/23* (2013.01); *B22F 7/04* (2013.01); *C22C 1/0433* (2013.01); *C22C 1/05* (2013.01); *B22F 2007/047* (2013.01)

(56) References Cited

U.S. PATENT DOCUMENTS

2017/0204012 A1* 7/2017 Wang ..................... C04B 35/64
2021/0343476 A1  11/2021 Nomura

FOREIGN PATENT DOCUMENTS

| TW | I429611 B   | 3/2014  |
|----|-------------|---------|
| TW | 201926365 A | 7/2019  |
| TW | 202041466 A | 11/2020 |
| TW | 202213407 A | 4/2022  |

OTHER PUBLICATIONS

Ji-Hun Kang et al., "Shrinkage behavior and interfacial diffusion in Ni-based internal electrodes with BaTiO3 additive," Ceramics International, May 10, 2007, vol. 34, pp. 1487-1494.

Christian Pithan et al., "Progress in the Synthesis of Nanocrystalline BaTiO3 Powders for MLCC," International Journal of Applied Ceramic Technology, 2005, vol. 2, No. 1, pp. 1-14.

Ji Zhen et al., "Non-reducible BaTiO3-based dielectric ceramics for Ni-MLCC synthesized by soft chemical method," Ceramics International, 2006, vol. 32, pp. 447-450.

* cited by examiner

METAL ELECTRODE OF CERAMIC CAPACITOR AND METHOD OF FORMING THE SAME

RELATED APPLICATION

This application claims priority to China Application Serial Number 202211448549.8, filed Nov. 18, 2022, which is herein incorporated by reference in its entirety.

BACKGROUND

Field of Invention

The disclosure relates to a metal electrode of a ceramic capacitor and a method of forming the same, and more particularly, to a metal electrode of a ceramic capacitor with increasing electrode continuity and a method of forming the same.

Description of Related Art

A multi-layer ceramic capacitor (MLCC) can increase capacity of the capacitor significantly by a structure with comb-shaped slice, thereby decreasing a dimension of electronic products.

Taking the MLCC with nickel electrodes as an example, after green compact is stacked by hot isostatic pressing, there are several heterogeneous regions within the electrodes. At a temperature of about 950° C. to about 1000° C., nickel powders of the heterogeneous regions may be densified first. Tensile stress due to a sintering operation may induce substances flowing to a thicker region from a thinner region. At high temperature (e.g. about 1100° C.), the nickel electrodes are completely densified, and barium titanate ($BaTiO_3$) added in the electrodes may begin to densify at this moment; thus, the nickel electrodes endure compressive stress, causing shrink of nickel. Moreover, expansion of barium titanate tends to cause discontinuity of the electrodes.

Figure 1A:
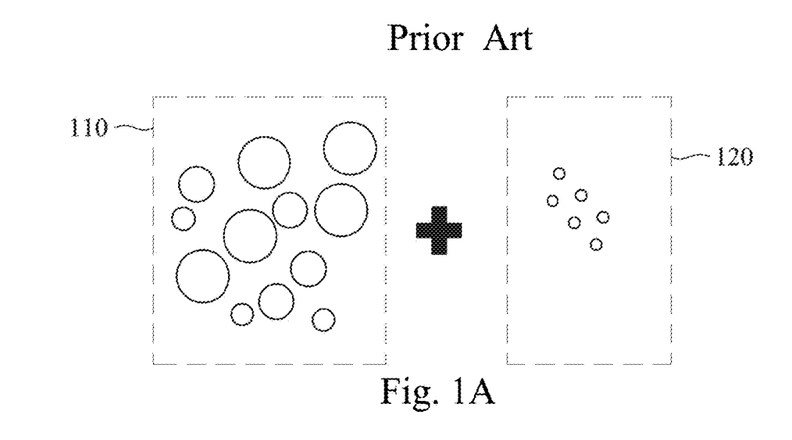
FIG. 1A illustrates a diagram of a conventional process of the nickel electrodes.
Figure 1B:
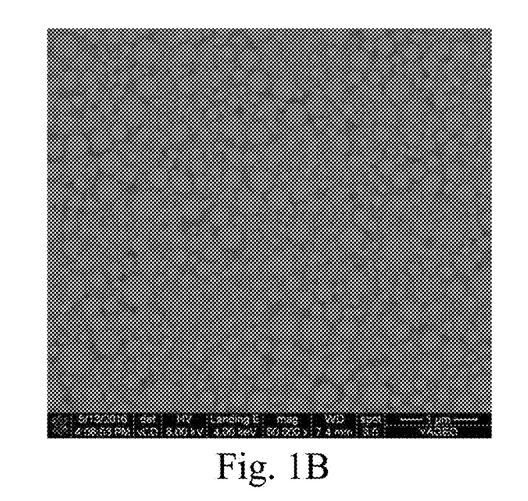
FIG. 1B is an electron micrograph of a mixture of nickel slurry and barium titanate powders in the conventional nickel electrode process.

Referring to FIG. 1A, FIG. 1A illustrates a diagram of a conventional process of the nickel electrodes. To improve the above discontinuity problem of the electrodes, barium titanate powders 120 are added in nano-size into nickel slurry 110 in the conventional method, and inner stress due to the sintering operation may be decreased by delaying initial shrinking temperature of the nickel electrodes. However, discontinuity of the electrodes is generally resulted from nonuniformity of the green compact, and the nano-barium titanate powders 120 is hard to disperse homogeneously in the nickel slurry 110; thus, particles after mixing tends to agglomerate together, as shown in FIG. 1B. As a result, the conventional method still cannot solve the discontinuity problems of the electrodes effectively.

Accordingly, there is a need to provide a metal electrode of a ceramic capacitor and a method of forming the same to improve dispersion problems of barium titanate within metal powders, thereby optimizing discontinuity of the electrodes.

SUMMARY

An aspect of the disclosure is to provide a method of forming a metal electrode of a ceramic capacitor, which increases continuity of the electrodes by mixing metal powders with a barium titanate organic-precursor.

Another aspect of the disclosure is to provide a metal electrode of a ceramic capacitor, which is produced by the method of the above aspect.

According to the aforementioned aspect, the method of forming the metal electrode of the ceramic capacitor is provided. The method includes mixing metal powders and a barium titanate organic-precursor to obtain precursor powders; adding an adhesive to the precursor powders to obtain a metal slurry; performing a molding process to the metal slurry to obtain a film material; performing a binder burn-out process to the film material to obtain a degumming film; and performing a sintering process to the degumming film to obtain the metal electrode. Based on an amount of the metal powders as 100 wt %, an amount of the barium titanate organic-precursor is 3 wt % to 15 wt %. The above binder burn-out process makes the barium titanate-organic precursor transform to barium titanate.

According to an embodiment of the disclosure, the step of mixing the metal powders and the barium titanate organic-precursor further includes adding a metal organic-precursor. Based on the amount of the metal powders as 100 wt %, an amount of the metal organic-precursor is 3 wt % to 15 wt %.

According to an embodiment of the disclosure, the metal organic-precursor comprises at least one of Ni, Sn, Cu, Ga, In, Tl and Sb.

According to an embodiment of the disclosure, a method of producing the metal organic-precursor comprises following steps: mixing an organic acid and an organic amine to obtain a mixing solution; and adding an organic acid metal salt into the mixing solution to obtain the metal organic-precursor.

According to an embodiment of the disclosure, the step of mixing the metal powders and the barium titanate organic-precursor further includes adding a metal oxide organic-precursor. Based on an amount of the barium titanate organic-precursor as 100 mol %, an amount of the metal oxide organic-precursor is 0.5 mol % to 5 mol %.

According to an embodiment of the disclosure, the metal oxide organic-precursor includes at least one of Mg, Dy, V, Cr, Mn, Fe, Co, Li, Ho, Y, Tb and Ca.

According to an embodiment of the disclosure, a method for producing the barium titanate organic-precursor comprises following steps: heating an organic acid to a temperature of 60° C. to 80° C. to obtain a high-temperature organic acid; adding barium carbonate powders into the high-temperature organic acid to obtain a barium carbonate-organic acid solution; and adding tetrabutyl titanate into the barium carbonate-organic acid solution to obtain the barium titanate organic-precursor.

According to an embodiment of the disclosure, the binder burn-out process comprises heating the film material at a temperature of 150° C. to 900° C.

According to an embodiment of the disclosure, the sintering process comprises heating the degumming film at a temperature of 1100° C. to 1220° C.

Another aspect of the disclosure provides a metal electrode of a ceramic capacitor produced by the method of the above aspect.

According to the another aforementioned aspect, the method of forming the metal electrode of the ceramic capacitor is provided. The method includes mixing metal powders and a barium titanate organic-precursor to obtain precursor powders, in which based on an amount of the metal powders as 100 wt %, an amount of the barium titanate organic-precursor is 3 wt % to 15 wt %; heating the precursor powders to a temperature of 150° C. to 900° C. to obtain a metal electrode film, in which the metal electrode film comprises the metal powders coated by barium titanate particles, and the barium titanate particles are transformed from the barium titanate organic-precursor; and performing a sintering process to the metal electrode film to obtain the metal electrode.

According to an embodiment of the disclosure, the step of mixing the metal powders and the barium titanate organic-precursor further includes adding a metal organic-precursor. Based on the amount of the metal powders as 100 wt %, an amount of the metal organic-precursor is 3 wt % to 15 wt %.

According to an embodiment of the disclosure, the metal organic-precursor comprises Ni, Sn, Cu, Ga, In, TI, Sb or combination thereof.

According to an embodiment of the disclosure, the metal organic-precursor transformed to metal when heating the precursor powders.

According to an embodiment of the disclosure, the step of mixing the metal powders and the barium titanate organic-precursor further includes adding metal organic-precursor and a metal oxide organic-precursor. Based on the amount of the metal powders as 100 wt %, an amount of the metal organic-precursor is 3 wt % to 15 wt %, and based on an amount of the barium titanate organic-precursor as 100 mol %, an amount of the metal oxide organic-precursor is 0.5 mol % to 5 mol %.

According to an embodiment of the disclosure, the metal oxide organic-precursor includes Mg, Dy, V, Cr, Mn, Fe, Co, Li, Ho, Y, Tb, Ca or combination thereof.

According to an embodiment of the disclosure, the metal oxide organic-precursor transformed to metal oxide when heating the precursor powders.

According to an embodiment of the disclosure, the sintering process comprises heating the metal electrode film at a temperature of 1100° C. to 1220° C.

Therefore, with the application of the metal electrode of the ceramic capacitor and the method of forming the same of the disclosure, mixing specific amount of the metal powders and the barium titanate organic-precursor, and heating in the following process to transform the barium titanate organic-precursor to barium titanate and homogeneously disperse between the metal, thereby achieving effect of increasing continuity of the electrodes.

BRIEF DESCRIPTION OF THE DRAWINGS

The disclosure can be more fully understood by reading the following detailed description of the embodiment, with reference made to the accompanying drawings as follows.

DETAILED DESCRIPTION

As used herein, "around," "about," "approximately," or "substantially" shall generally mean within 20 percent, or within 10 percent, or within 5 percent of a given value or range.

As described above, the present disclosure provides a metal electrode of a ceramic capacitor and a method of forming the same, mixing specific amount of the metal powders and the barium titanate organic-precursor, and a binder burn-out process transforms the barium titanate organic-precursor to barium titanate and homogeneously disperse between the metal, thereby achieving effect of increasing continuity of the electrodes and decreasing shrinkage of the electrodes.

Figure 2A:
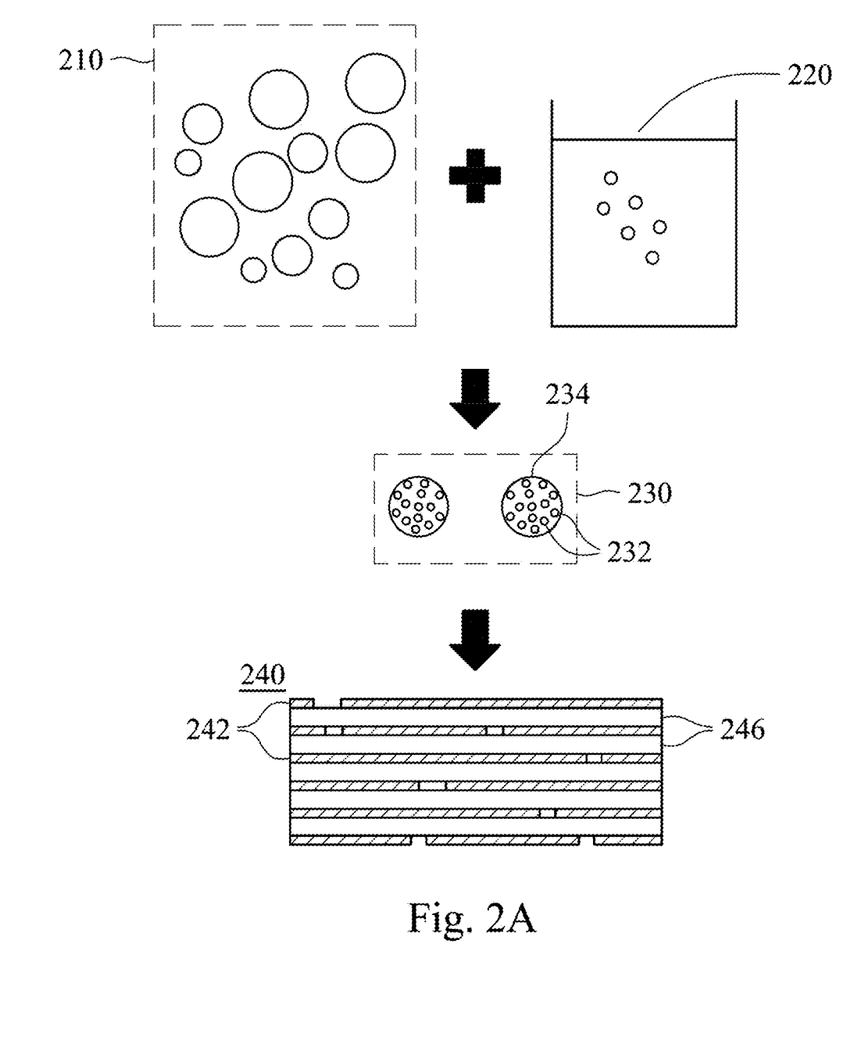
FIG. 2A illustrates a diagram of a method of forming a metal electrode of a ceramic capacitor according to some embodiments of the disclosure.
Figure 3:
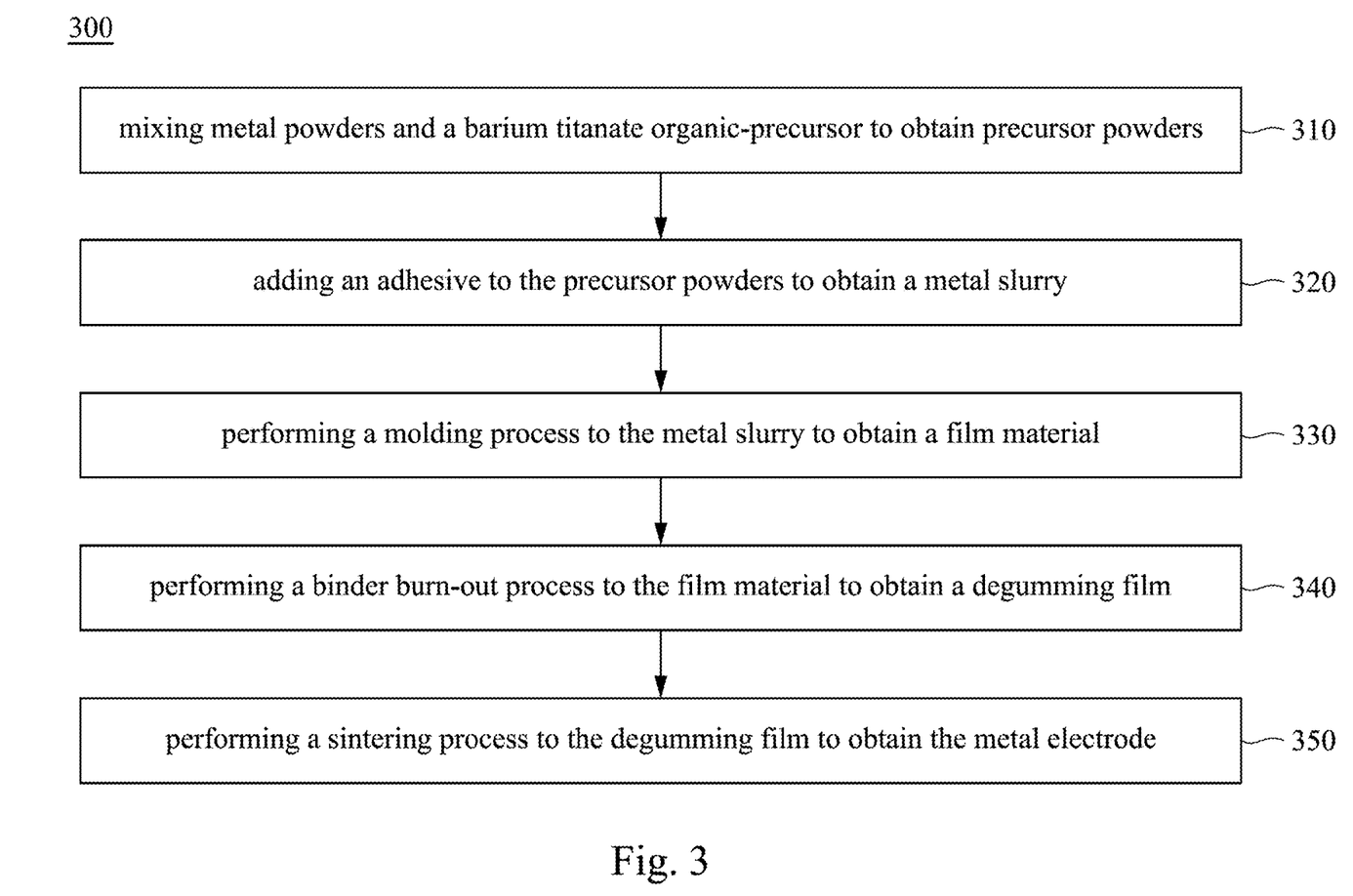
FIG. 3 illustrates a flow chart of a method of forming a metal electrode of a ceramic capacitor according to some embodiments of the disclosure.

Referring to FIGS. 2A and 3, FIG. 2A illustrates a diagram of the method of forming the metal electrode of the ceramic capacitor according to some embodiments of the disclosure, and FIG. 3 illustrates a flow chart of the method of forming the metal electrode of the ceramic capacitor according to some embodiments of the disclosure. First, operation 310 is performed to mix metal powders 210 and a barium titanate organic-precursor 220 to obtain precursor powders.

In some embodiments, based on an amount of the metal powders as 100 wt %, an amount of the barium titanate organic-precursor is about 3 wt % to about 15 wt %, about 5 wt % to about 13 wt % is preferable, and about 10 wt % is more preferable. If the amount of the barium titanate organic-precursor is too less (for example, less than about 3 wt %), the effect of suppressing shrinkage of the electrodes may not be achieved; on the contrary, if the amount of the barium titanate organic-precursor is too much (for example, greater than about 15 wt %), continuity of the electrodes obtained is poor.

In some embodiments, a method of producing the barium titanate organic-precursor includes first heating an organic acid to a temperature of 60° C. to 80° C. to obtain a high-temperature organic acid. Subsequently, barium carbonate ($BaCO_3$) powders are added into the high-temperature organic acid, which is stirred to dissolve for about 1 hour, to obtain a barium carbonate-organic acid solution. After the barium carbonate-organic acid solution is homogeneously mixed, the solution is cooled to room temperature. Then, tetrabutyl titanate ($Ti(C_4H_9O)_4$) is added into the barium carbonate-organic acid solution, which is stirred to dissolve for about 1 hour, to obtain the barium titanate organic-precursor. In some embodiments, the organic acid may be acetic acid, citric acid or any other suitable organic acids.

In some embodiments, in the process of the operation 310, a metal organic-precursor is selectively added. The metal organic-precursor can also transform to metal in the following high-temperature (at a temperature of about 250° C. to about 300° C.) process, and the metal can fill in gaps between the metal electrodes to optimize continuity of the electrodes. Based on the amount of the metal powders as 100 wt %, an amount of the metal organic-precursor is about 3 wt % to about 15 wt %, and about 6 wt % to about 12 wt % is preferable. The aforementioned amount of the metal organic-precursor is enough for the electrodes to have the best packing effect. In some examples, the metal organic-precursor includes at least one of Ni, Sn, Cu, Ga, In, TI and Sb. One or several kind(s) of the metal organic-precursor(s) are selected according to material of the metal powders.

In some embodiments, a method of preparing the metal organic-precursor includes mixing an organic acid and an organic amine as a ligand, which is stirred for about 15 minutes at room temperature, to obtain a mixing solution. Then, an organic acid metal salt is added into the mixing solution, which is stirred for about 1 hour at room temperature, to obtain the metal organic-precursor including metal and organic amine complex. In some embodiments, the organic acid may be 2,5-dihydroxyterephthalic acid. In some embodiments, the organic amine may be 2-ethyl-hexylamine.

In some embodiments, in the process of the operation 310, a metal oxide organic-precursor can be selectively added. The metal oxide organic-precursor can also transform to metal oxide in the following high-temperature (at a temperature of about 250° C. to about 300° C.) process, and the metal oxide can improve junction leakage current of the obtained electrodes, and even increasing reliability and mean time to failure (MTTF) of the ceramic capacitor. In some embodiments, the metal oxide after transforming includes magnesium oxide or oxides of rare earth elements. Based on an amount of the barium titanate organic-precursor as 100 mol %, an amount of the metal oxide organic-precursor is about 0.5 mol % to about 5 mol %, and about 2 mol % to about 3.5 mol % is preferable. In some examples, the metal oxide organic-precursor includes at least one of Mg, Dy, V, Cr, Mn, Fe, Co, Li, Ho, Y, Tb and Ca.

Subsequently, operation 120 is performed to add an adhesive to the precursor powders to obtain metal slurry. The adhesive is used to bind the precursor powders. In some examples, the adhesive includes polyvinyl acetal resin and any other suitable resins, and it is no limitation in the present disclosure. In some embodiments, the operation 320 can selectively add a solvent into the precursor powders to mix the adhesive and the precursor powders homogeneously. In some example, the solvent may be alcohol.

Then, operation 330 is performed to perform a molding process to the metal slurry to obtain a film material. In some embodiments, the molding process can use printing operation, which prints the metal slurry on a ceramic tem plate.

Subsequently, operation 340 is performed to perform a binder burn-out process to the film material to obtain a degumming film. In some embodiments, the binder burn-out process includes heating the film material at a temperature of 150° C. to 900° C. The binder burn-out process uses the aforementioned temperature can not only remove the above adhesive, and it also transform the barium titanate organic-precursor to barium titanate to cover surfaces of the metal particles, and thus increasing dispersity of barium titanate between the metal particles. In other embodiments of adding the metal organic-precursor and/or the metal oxide organic-precursor, the binder burn-out process can also transform the metal organic-precursor to metal, and transform the metal oxide organic-precursor to metal oxide.

Figure 2B:
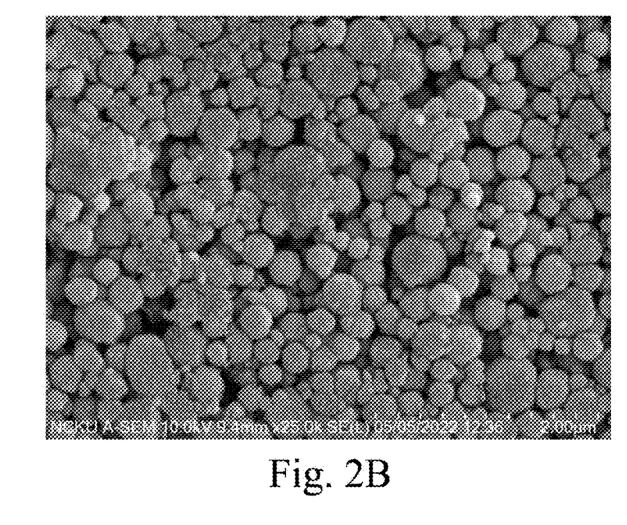
FIG. 2B and FIG. 2C are electron micrograph of the metal electrodes according to some embodiments of the disclosure.
Figure 2C:
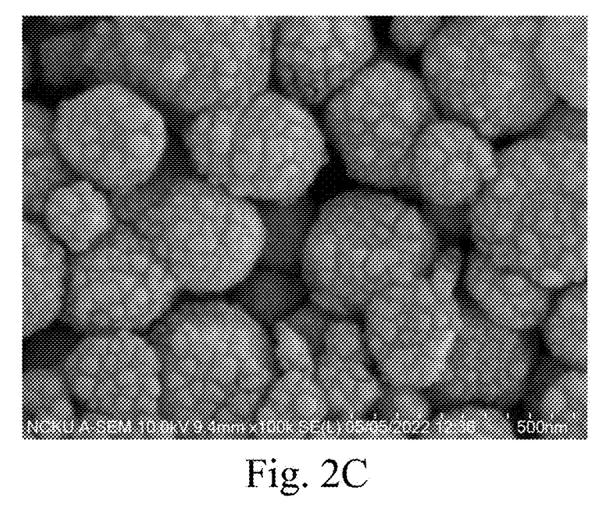

Referring to FIG. 2A again, the barium titanate precursor can transform to barium titanate particles 232 in the binder burn-out process in the operation 340, and the barium titanate particles 232 cover the metal particles 234 to avoid agglomeration of the metal particles 234, thereby forming the metal electrodes 230. FIGS. 2B and 2C are electron micrographs of the metal electrodes 230. As shown in FIGS. 2B and 2C, compared to FIG. 1B, the metal particles 234 and barium titanate particles 232 of the metal electrodes 230 do not agglomerate together with each other.

Then, referring to FIGS. 2A and 3, operation 350 is performed to perform a sintering process to the degumming film to form the metal electrode layers 242 of the ceramic capacitor 240. In some embodiments, the sintering process includes heating the degumming film at a temperature of 1100° C. to 1220° C. As shown in FIG. 2A, the ceramic capacitor 240 includes multi-layer stack of the metal electrode layers 242 and ceramic dielectric layers 246.

The conventional nickel electrodes formed by adding barium titanate powders have deviation of thickness of about 0.0327, continuity of electrodes of about 85.1%, shrinkage of electrodes of about 23.3%, deviation of capacity of about 2.03%, green density of about 4.2 g/cm$^3$, and MTTF of about 14 hours. By contrast, the electrodes formed by the method 300 of forming the metal electrodes of the present disclosure can have better electrode characteristics. In some embodiments, the metal electrodes of the ceramic capacitor of the present disclosure can have deviation of thickness of about 0.0256, continuity of electrodes of about 97.9%, shrinkage of electrodes of about 15.6%, deviation of capacity of about 0.86%, green density of about 5.7 g/cm$^3$, and MTTF of about 58 hours.

The following embodiments are provided to better elucidate the practice of the present disclosure and should not be interpreted in anyway as to limit the scope of same. Those skilled in the art will recognize that various modifications may be made while not departing from the spirit and scope of the disclosure.

Evaluation Method
Shrinkage of Electrodes

After drying electrode paste at a temperature lower than 100° C., the dried electrode paste is ground by using a mortar. Then, after screening by sieve with 100 mesh, the screened electrode paste is pressed to tablets by using jig of 0.5 g/6 mm (manual machine with 2 tons/20 seconds). After heating the tablets by using a degumming furnace, a volume change rate with temperature is measured by a thermomechanical analyzer.

Continuity of Electrodes

After performing a destructive physical analysis (DPA) to the obtained electrodes, measure continuity of electrodes (i.e. coverage of electrodes) by using software IpWin 5.

Thickness of Electrodes

After acid etching to the obtained electrodes, measure thickness of electrodes by using software ImageJ.

Green Density

An electrode paste in 1 mm is scraped to dispose over a PET film. The PET film with the electrode paste is placed in a vacuum tank to be vacuumized, and then dried in a drying oven at 100° C. for 4 hours. Density of the dried sample is measured by using a gravimeter.

MTTF (Mean Time to Failure)

The electrodes are performed a highly accelerated life testing (HALT) at high temperature and high pressure to measure MTTF of the electrodes.

Capacitance Deviation Value

Capacitance deviation value is a ratio between a capacitance of the electrodes and a standard capacitance, which is 10 μF.

Embodiment 1

Embodiment 1 mixes nickel powders and a barium titanate organic-precursor, and form an electrode according to the method 100 of forming the metal electrode. Based on an amount of the nickel powders as 100 wt %, 3 wt % of the barium titanate organic-precursor is added in embodiment 1. Subsequently, the formed electrode of embodiment 1 is performed measurement of shrinkage of electrodes, continuity of electrodes, thickness of electrodes and capacitance deviation value, and the measurement results are shown in table 1.

Embodiments 2-4 and Comparative Examples 1-4

The nickel electrodes are formed according to the method of embodiment 1 in embodiments 2-4, and the differences from embodiment 1 are amounts of the barium titanate organic-precursor. The nickel powders are mixed with the barium titanate powders used in the conventional method in comparative examples 1-4, and the nickel electrodes are formed by steps of the method 100. The amounts of the barium titanate organic-precursor or the barium titanate powders used by embodiments 2-4 and comparative examples 1-4 and the measurement results are shown in table 1 below. The amounts of barium titanate mean weight ratio between the barium titanate organic-precursors and the barium titanate powders to the nickel powders, respectively.

TABLE 1

|  | amount of barium titanate (wt %) | shrinkage of electrode (%) | continuity of electrode (%) | electrode thickness (μm) | deviation of electrode thickness | Capacitance deviation value(%) |
|---|---|---|---|---|---|---|
| Embodiment 1 | 3 | 22.2 | 90.2 | 0.948 | 0.0305 | 1.2 |
| Embodiment 2 | 5 | 18.5 | 92.4 | 0.935 | 0.0284 | 1.05 |
| Embodiment 3 | 10 | 15.6 | 93.2 | 0.922 | 0.0256 | 1.02 |
| Embodiment 4 | 15 | 17.9 | 92.1 | 0.938 | 0.0269 | 1.13 |
| Comparative example 1 | 3 | 32.6 | 80.3 | 0.962 | 0.0376 | 2.26 |
| Comparative example 2 | 5 | 27.6 | 83.5 | 0.953 | 0.0352 | 2.13 |
| Comparative example 3 | 10 | 23.3 | 85.1 | 0.947 | 0.0327 | 2.03 |
| Comparative example 4 | 15 | 25.5 | 84.8 | 0.95 | 0.0356 | 1.96 |

As shown in table 1, embodiments 1-4 using the barium titanate organic-precursors help dispersity of barium titanate between the metals. Therefore, compared to comparative examples 1-4, the shrinkage of electrodes of embodiments 1-4 decreases to lower than or equal to 22.2%, and the continuity of electrodes of embodiments 1-4 are greater than 90%. Moreover, flatness of the electrodes is better (that is, the deviation of electrodes thickness is smaller). Compared to Comparative examples 1-4, the capacitance deviation values of embodiments 1-4 are smaller.

Embodiments 5-14

The similar experiment condition as embodiment 3 is used in embodiments 5-14, and add metal organic-precursors of nickel (Ni), tin (Sn) and copper (Cu) with total amount of 5 wt % (based on the amount of the nickel powders as 100 wt %). The amounts of the metal organic-precursors of Ni, Sn and Cu added by embodiments 5-14 are shown in table 2. Then, the continuity of electrodes, the green density and the capacitance deviation values are measured to the formed electrodes, respectively, and the measurement results are shown in table 2.

TABLE 2

|  | amounts of the metal organic-precursors of Ni/Sn/Cu (wt %) | green density (g/cm$^3$) | continuity of electrode (%) | Capacitance deviation value(%) |
|---|---|---|---|---|
| Embodiment 3 | 0/0/0 | 4.7 | 93.2 | 1.02 |
| Embodiment 5 | 5/0/0 | 5.5 | 95.3 | 0.96 |
| Embodiment 6 | 3/2/0 | 5.3 | 95.8 | 0.95 |
| Embodiment 7 | 2/2/1 | 5.7 | 97.5 | 0.86 |
| Embodiment 8 | 0/5/0 | 4.9 | 96.2 | 0.98 |
| Embodiment 9 | 0/3/2 | 5.1 | 95.4 | 0.95 |
| Embodiment 10 | 3/1/1 | 4.9 | 96.5 | 0.99 |
| Embodiment 11 | 1/1/3 | 5.2 | 97.2 | 0.9 |
| Embodiment 12 | 1/3/1 | 5.6 | 97.1 | 0.9 |
| Embodiment 13 | 2/0/3 | 5.2 | 96.8 | 0.93 |
| Embodiment 14 | 0/0/5 | 4.9 | 95.4 | 0.97 |

As shown in table 2, addition and ratios of the metal organic-precursors can increase the continuity of electrodes from 93.2% to 97.5%, for example. Moreover, compared to embodiment 3, without adding the metal organic-precursors, the green densities of embodiments 5-14 all tend to increase, such as from 4.7 g/cm$^3$ to 5.7 g/cm$^3$. Within Embodiments 5-14, respective addition of 2 wt %, 2 wt % and 1 wt % of the Ni, Sn and Cu metal organic-precursors of Embodiment 7 has the best performance.

Embodiments 15-19

The similar experiment condition as Embodiment 7 is used in embodiments 15-19, and metal oxide organic-precursors of magnesium oxide (MgO) and/or dysprosium oxide ($Dy_2O_3$) are added. Based on an amount of the barium titanate organic-precursor as 100 mol %, the metal oxide organic-precursors with total amount of about 2 mol % is added in embodiments 15-19, and the addition amounts are shown in table 3. The continuity of electrode and the MTTF are measured to the electrodes of embodiments 15-19, respectively, and the measurement results are shown in table 3.

TABLE 3

|  | amounts of MgO/$Dy_2O_3$ precursors (mol %) | continuity of electrode (%) | MTTF (hr) |
|---|---|---|---|
| Embodiment 7 | 0/0 | 97.5 | 23 |
| Embodiment 15 | 2/0 | 97.5 | 21 |
| Embodiment 16 | 0/2 | 97.5 | 40 |
| Embodiment 17 | 1.5/0.5 | 97.6 | 30 |
| Embodiment 18 | 0.5/1.5 | 97.9 | 58 |
| Embodiment 19 | 1/1 | 97.5 | 36 |

As shown in table 3, compared to embodiment 7 without adding the metal oxide organic-precursors, addition of the metal oxide organic-precursors can significantly increase MTTF of the capacitor, such as from about 23 hours to about 58 hours. Moreover, the continuity of electrodes of embodiments 15-19 can maintain as greater than 97.5%. Within embodiments 15-19, as total amount of addition of the metal oxide organic-precursors is about 2 mol %, Embodiment 18, which added the metal oxide organic-precursors with 0.5 mol % of MgO and 1.5 mol % of $Dy_2O_3$, has the best characteristics of electrodes, namely, the longest MTTF and the greatest continuity of electrode.

According to the above embodiments, the present disclosure provides a method of forming a metal electrode of a ceramic capacitor. By mixing specific amount of the metal powders and the barium titanate organic-precursor, and in the following binder burn-out process, the barium titanate organic-precursor is transformed to barium titanate and homogeneously disperses between the metal, thereby achieving effect of increasing continuity of the electrodes and decreasing shrinkage of the electrodes. Moreover, little amount of the metal organic-precursors and/or the metal oxide organic precursors can be selectively added to further increase continuity of the electrodes and MTTF.

Although the disclosure has been described in considerable detail with reference to certain embodiments thereof, other embodiments are possible. It will be apparent to those skilled in the art that various modifications and variations can be made to the structure of the disclosure without departing from the scope or spirit of the disclosure. Therefore, the spirit and scope of the appended claims should not be limited to the description of the embodiments contained herein.

What is claimed is:

1. A method of forming a metal electrode of a ceramic capacitor, comprising:
    mixing metal powders, a metal oxide organic-precursor and a barium titanate organic-precursor to obtain precursor powders, wherein based on an amount of the metal powders as 100 wt %, an amount of the barium titanate organic-precursor is 3 wt % to 15 wt %, and based on an amount of the barium titanate organic-precursor as 100 mol %, an amount of the metal oxide organic-precursor is 0.5 mol % to 5 mol %;
    adding an adhesive to the precursor powders to obtain a metal slurry;
    performing a molding process to the metal slurry to obtain a film material;
    performing a binder burn-out process to the film material to obtain a degumming film, wherein the binder burn-out process makes the barium titanate organic-precursor transform to barium titanate; and
    performing a sintering process to the degumming film to obtain the metal electrode.

2. The method of claim 1, wherein the step of mixing the metal powders and the barium titanate organic-precursor further comprises:
    adding a metal organic-precursor, wherein based on the amount of the metal powders as 100 wt %, an amount of the metal organic-precursor is 3 wt % to 15 wt %.

3. The method of claim 2, wherein the metal organic-precursor comprises at least one of Ni, Sn, Cu, Ga, In, Tl and Sb.

4. The method of claim 2, wherein a method for producing the metal organic-precursor comprises the following steps:
    mixing an organic acid and an organic amine to obtain a mixing solution; and
    adding an organic acid metal salt into the mixing solution to obtain the metal organic-precursor.

5. The method of claim 1, wherein the metal oxide organic-precursor includes at least one of Mg, Dy, V, Cr, Mn, Fe, Co, Li, Ho, Y, Tb and Ca.

6. The method of claim 1, wherein a method for producing the barium titanate organic-precursor comprises following steps:
    heating an organic acid to a temperature of 60° C. to 80° C. to obtain a high-temperature organic acid;
    adding barium carbonate powders into the high-temperature organic acid to obtain a barium carbonate-organic acid solution; and
    adding tetrabutyl titanate into the barium carbonate-organic acid solution to obtain the barium titanate organic-precursor.

7. The method of claim 1, wherein the binder burn-out process comprises heating the film material at a temperature of 150° C. to 900° C.

8. The method of claim 1, wherein the sintering process comprises heating the degumming film at a temperature of 1100° C. to 1220° C.

9. A method of forming a metal electrode of a ceramic capacitor, comprising:
    mixing metal powders, a metal organic-precursor and a barium titanate organic-precursor to obtain precursor powders, wherein based on an amount of the metal powders as 100 wt %, an amount of the barium titanate organic-precursor is 3 wt % to 15 wt %, and an amount of the metal organic-precursor is 3 wt % to 15 wt %;
    heating the precursor powders to a temperature of 150° C. to 900° C. to obtain a metal electrode film, wherein the metal electrode film comprises the metal powders coated by barium titanate particles, and the barium titanate particles are transformed from the barium titanate organic-precursor; and
    performing a sintering process to the metal electrode film to obtain the metal electrode.

10. The method of claim 9, wherein the metal organic-precursor comprises Ni, Sn, Cu, Ga, In, Tl, Sb or combination thereof.

11. The method of claim 9, wherein the metal organic-precursor transforms to metal when heating the precursor powders.

12. The method of claim 9, wherein the step of mixing the metal powders, the metal organic-precursor and the barium titanate organic-precursor further comprises:
    adding a metal oxide organic-precursor, wherein based on an amount of the barium titanate organic-precursor as 100 mol %, an amount of the metal oxide organic-precursor is 0.5 mol % to 5 mol %.

13. The method of claim 12, wherein the metal oxide organic-precursor includes Mg, Dy, V, Cr, Mn, Fe, Co, Li, Ho, Y, Tb, Ca or combination thereof.

14. The method of claim 12, wherein the metal oxide organic-precursor transforms to metal oxide when heating the precursor powders.

15. The method of claim 12, wherein the sintering process comprises heating the metal electrode film at a temperature of 1100° C. to 1220° C.

* * * * *